United States Patent [19]
Davies

[11] Patent Number: 6,098,388
[45] Date of Patent: Aug. 8, 2000

[54] MOWER COUPLING SYSTEM

[76] Inventor: Douglas N. Davies, 1410 Cardinal La., Lantana, Fla. 33462

[21] Appl. No.: 08/996,743

[22] Filed: Dec. 23, 1997

[51] Int. Cl.⁷ .................................................. A01D 34/53
[52] U.S. Cl. .............................. 56/249; 56/253; 56/294; 56/DIG. 14; 56/DIG. 20
[58] Field of Search ............................. 56/7, 249, 249.5, 56/253, 294, DIG. 14, DIG. 20

[56] References Cited

U.S. PATENT DOCUMENTS

| | | |
|---|---|---|
| 724,962 | 4/1903 | Soss . |
| 2,130,116 | 9/1938 | Blydenburgh ................................. 56/7 |
| 3,058,281 | 10/1962 | Lewis ....................................... 56/12.6 |
| 3,751,889 | 8/1973 | Overesch . |
| 3,871,781 | 3/1975 | Long . |
| 4,769,976 | 9/1988 | Bassett et al. . |
| 4,777,786 | 10/1988 | Arnold . |
| 4,866,917 | 9/1989 | Phillips et al. . |
| 4,947,630 | 8/1990 | Rich et al. . |
| 5,042,236 | 8/1991 | Lamusga et al. . |
| 5,076,044 | 12/1991 | Shattuck . |
| 5,193,330 | 3/1993 | Nusser . |
| 5,293,729 | 3/1994 | Curry et al. ................................... 56/7 |
| 5,412,932 | 5/1995 | Schueler . |
| 5,459,984 | 10/1995 | Reichen et al. ..................... 56/DIG. 14 |
| 5,463,853 | 11/1995 | Santoli et al. . |
| 5,628,169 | 5/1997 | Stiller et al. ................................... 56/7 |

FOREIGN PATENT DOCUMENTS 3930-811 9/1990 Germany .

*Primary Examiner*—Thomas B. Will
*Assistant Examiner*—Arpad Fabian Kovacs
*Attorney, Agent, or Firm*—Quarles & Brady LLP

[57] ABSTRACT

A coupling system for a lawn maintenance machine having at least one cutting unit comprises a pivoting device for pivoting the cutting unit around a pivot axis parallel to a traveling direction and substantially coincidental with a point of contact between the cutting unit and a surface upon which the cutting unit is supported; and, a yoke attached to the pivoting device, the yoke configured for attachment to a motive unit.

19 Claims, 9 Drawing Sheets

MOWER COUPLING SYSTEM

BACKGROUND OF THE INVENTION

1. Field of the Invention

This invention relates to professional turf mowing equipment. More particularly, this invention relates to a new and improved coupling system for permitting the cutting unit of a mower to accurately follow the contours of the ground.

2. Description of Related Art

Mowing machines equipped with multiple cutting units intended for use on golf courses have evolved over the last 40 years reflecting the changing standards of the industry. In general, designs have changed to reflect the increased need for high precision mowing. Currently, there are many designs of coupling systems for attaching the individual cutting units to its parent tractor which allow the cutting units to rotate about one, two, or even three axes for the purpose of accommodating undulating terrain.

In addition, the need for a high quality cut has created the need for a grooved roller which supports the cutting units without excessively laying down the grass. Because a grooved roller has less contact area than a solid roller of equivalent dimensions, its contact areas exert a higher pressure on the turf. Side slippage, or scuffage, becomes a problem with grooved rollers because, as the slippage occurs, the individual segments of the roller pull on the turf. Side slippage is a problem that is well known to people versed in the field.

In conventional mower systems, side slippage can occur as the cutting unit compensates for undulating terrain by pivoting about an axis parallel to the traveling direction. Side slippage occurs with mower systems that do not place this pivot axis substantially coincidental with a point of contact between the cutting unit and the terrain upon which the cutting unit is supported.

Although many mowing devices have been developed that permit a cutting unit to follow the contours of the ground, these mowing devices do not adequately address the problem of side slippage. One example, as shown in U.S. Pat. No. 4,769,976, discloses a linkage for supporting a reel type cutting unit. The linkage provides three degrees of rotation for the cutting unit, allowing it to move independently over uneven terrain. However, the axis, parallel to the direction of travel, around which the cutting unit pivots, is well above ground level. Thus, this structure will cause side slippage.

Another example, as shown in U.S. Pat. No. 5,076,044, is directed to a system that allows the reel mowers in a gang to float and move along the ground in response to variations in the terrain. The reel mowers 30 are suspended by a pair of chains 48 and the reel is driven through a shaft having a pair of U joints, allowing the reel to float and follow the terrain. Again, the axis parallel to the direction of travel, around which the cutting unit pivots, is well above ground level.

Other suspension systems have been developed that create a virtual pivot. One example, as shown in U.S. Pat. No. 5,193,330, is directed to a support system for mower units. FIG. 1 shows an articulating support system that permits a mowing unit to pivot about an axis located below the ground surface using arcuate supports and sliding connections. The arrangement allows a mowing unit 12 to pivot about a pivot axis M transverse to the direction of travel which is below the mowing unit. Mowing unit 12 is suspended by two slide bodies 32 that ride on a curved guide path 31 in the form of a curved slide track. The radius of curvature has its center at point M below the ground surface. The position of the pivot axis M below the ground surface allows the mowing units to unweight the front side to allow easy movement over obstacles. This pivot arrangement is unsuitable to prevent side slippage because the pivot axis is transverse to the direction travel and the pivot axis is located away from ground. Another example, as shown in German Patent No. DE003930811, is directed to a device for matching mowing and cutting to the ground surface and is by the same inventor as the first reference discussed.

SUMMARY OF THE INVENTION

In accordance with the invention, the problem of side slippage and other problems with the prior art are avoided by providing a mower coupling system that creates a virtual pivot axis parallel to the traveling direction and located substantially at ground level.

A coupling system in accordance with an inventive arrangement for a lawn maintenance machine having at least one cutting unit comprises: a pivoting means for pivoting the cutting unit around a pivot axis parallel to a traveling direction and substantially coincidental with a point of contact between the cutting unit and a surface upon which the cutting unit is supported; and, a yoke attached to the pivoting means, the yoke configured for attachment to a motive unit.

The pivoting means further comprises friction reducing means having friction surfaces that define a radial path. The radial path defines a pivot axis about which an arcuate member passes pivotably. Examples of friction surfaces can include friction pads or even the inner surfaces of a pivot block. A stop pin, attached to the pivot block, which then passes through a slot in the arcuate member comprise a motion limiter for limiting the pivoting motion of the arcuate member though the pivot.

BRIEF DESCRIPTION OF THE DRAWINGS

Presently preferred embodiments of the inventive arrangements are shown in the drawings, it being understood, however, the inventive arrangements are not limited to the precise arrangements and instrumentalities shown.

DETAILED DESCRIPTION OF THE PREFERRED EMBODIMENTS

Figure 1:
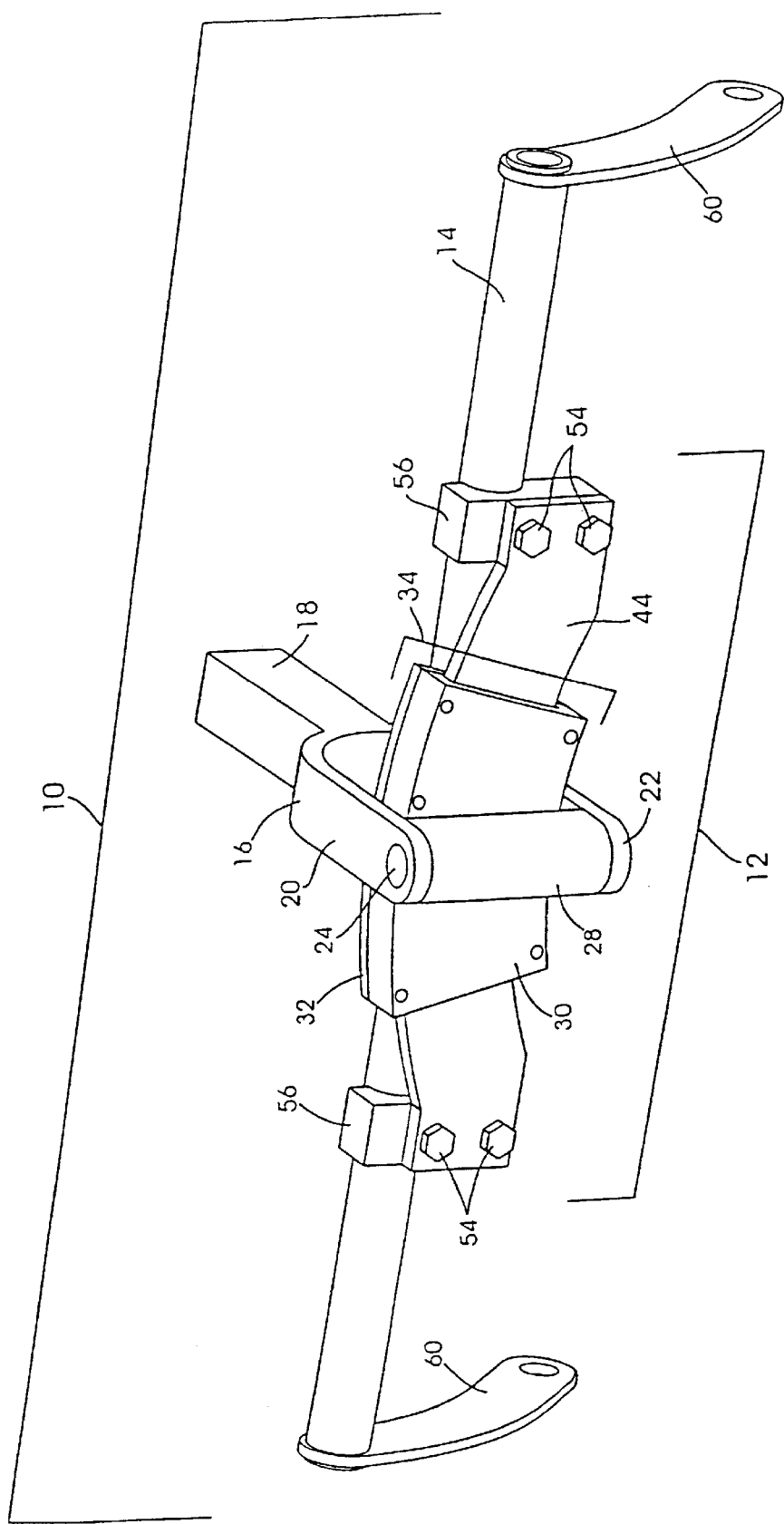
FIG. 1 is a right front top perspective of a mower coupling system.
Figure 2:
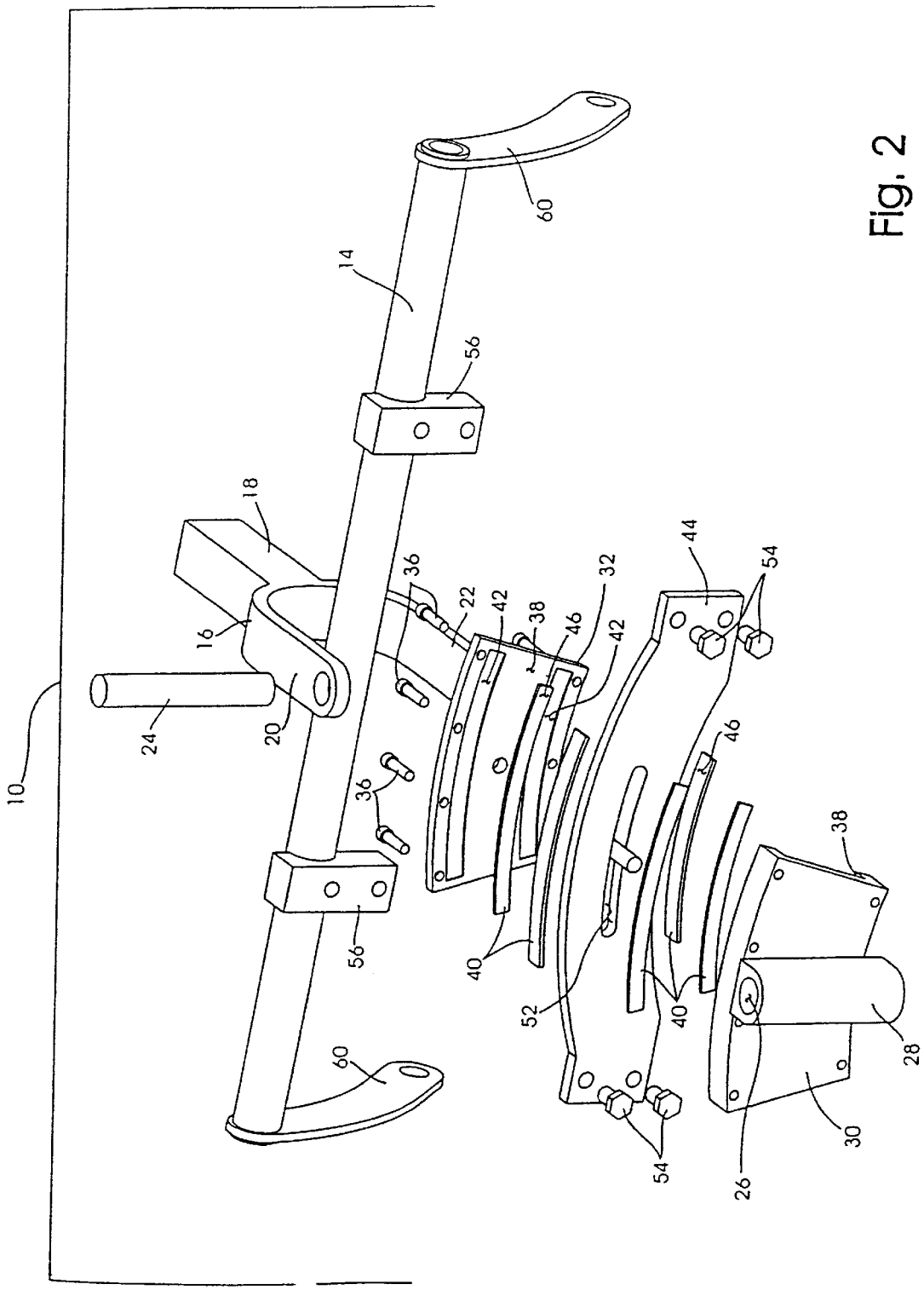
FIG. 2 is a exploded view of FIG. 1.
Figure 3:
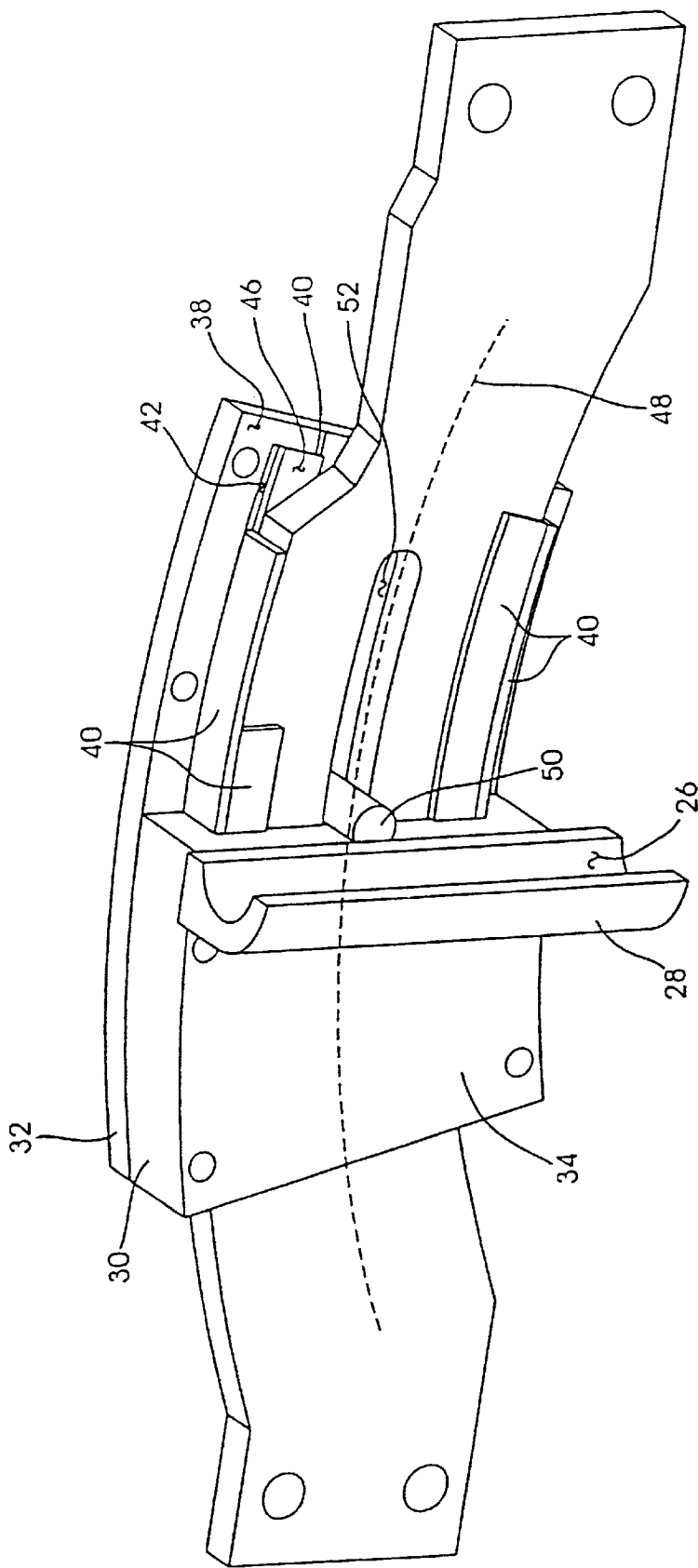
FIG. 3 is a right front top perspective and partly sectional view of a portion of the mower coupling system in FIG. 1.

FIGS. 1, 2, and 3 illustrate a mower unit coupling device according to an inventive arrangement. The mower unit coupling device 10 comprises a coupling system 12 attached to a tow bar 14 and a yoke assembly 16. The yoke assembly comprises a yoke arm 18 configured to be attached to a motive unit. The yoke assembly has an upper arm 20 and a lower arm 22 split from the yoke arm 18. A pivot pin 24 is attached to the upper arm 20 and lower arm 22. The pivot pin 24 also passes through the bore 26 of a pin receiver 28. The pin receiver 28 can rotate about an axis passing through the upper arm 20 and lower arm 22.

The yoke assembly 16 is connected to, or is integral with, the coupling system 12 by means of the pin receiver 28 which is attached to the front block half 30. The front block half 30 and a rear block half 32 are attached to each other, for example using cap screws 36, to form the pivot block 34. The pivot block 34 has an inner surface 38.

Friction pads 40 are preferably disposed on the inner surface 38. The friction pads 40 can be located within slots 42 or not. Also, the friction pads 40 can be attached to the inner surface 38 or not. The friction pads 40 have friction surfaces 46 that face an arcuate member 44. The friction pads 40 are preferably made from a low-friction material to allow the arcuate member 44 to easily pass through the pivot block 34. The friction surfaces 46 define a radial path 48 along which the arcuate member 44 passes. Alternative embodiments of the friction pads 40 which have friction surfaces 46 include any anti-friction device or material that can reduce the friction of the arcuate member 44 passing through the pivot block 34. For example, ball bearings, roller bearings, slides and similar structures may be used for the purpose. The inner surface 38 of the pivot block 34 can also act as a friction surface 46 without having intermediary features such as friction pads 40.

The surfaces on the arcuate member 44 where the arcuate member 44 contacts the friction surfaces 46 are preferably shaped to define the same radial path 48 that is defined by the friction surfaces 46. A stop pin 50 preferably passes through a bore in the rear block half 32, a limiting slot 52 in the arcuate member 44, and through a bore in the front block half 30. The stop pin 50 is preferably fixed in place in the front and rear block halves 30 and 32 by suitable hardware, by welding, or any other appropriate means. The width of the limiting slot 52 is slightly larger than the diameter of the stop pin 50 so as to allow the stop pin 50 to move freely in the limiting slot 52. The limiting slot 52 follows the radial path 48. As the arcuate member passes through the pivot block 34, the arcuate member's 44 motion is limited when the stop pin 50 reaches either end of the limiting slot 52. The arcuate member 44 is attached, for example with bolts 54, to receiving blocks 56 on the tow bar 14.

Figure 4:
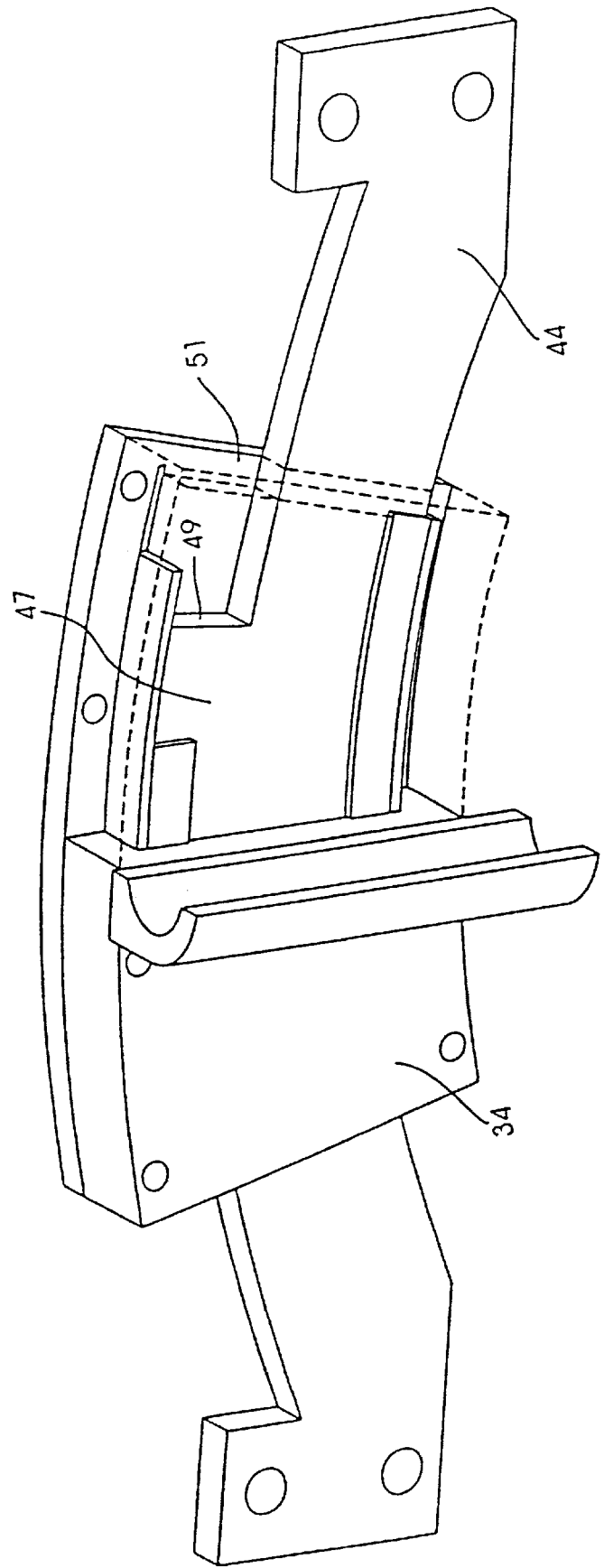
FIG. 4 is a right front top perspective and partly sectional view of an alternative embodiment of a limiting means.

The stop pin 50 and the limiting slot 52 are the presently preferred limiting means. It should be understood however, that the invention is not limited in this regard. For example, an alternative embodiment of a limiting means is shown in FIG. 4. Within the pivot block 34 a shoulder 47 extends upward from the arcuate member 44. Whereas the arcuate member 44 can pass through the pivot block 34, the shoulder 47 cannot. The motion of the shoulder 47 is limited when either side edge 49 of the shoulder contacts the inner side surface 51 of the pivot block 34.

Figure 5:
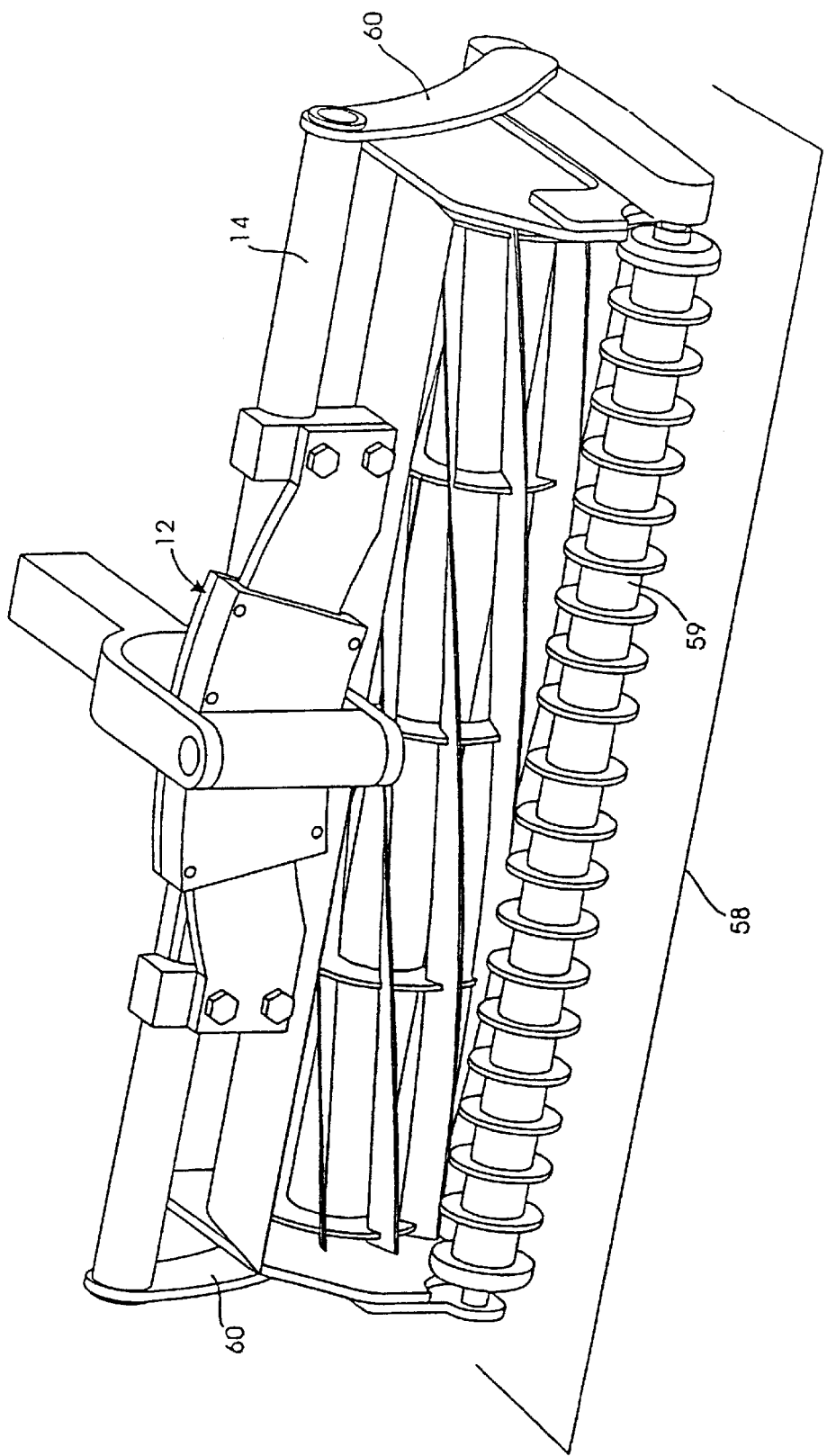
FIG. 5 is a right front top perspective view of the mower coupling system in FIG. 1 mounted to a reel-type cutting unit.

FIG. 5 illustrates a preferred embodiment for attaching the reel-type cutting unit 58 to the coupling system 12. The coupling system 12 attaches to the tow arm 14. The tow arm 14 has two propulsion arms 60. The reel-type cutting unit 58 is attached to each of the propulsion arms 60. As can be seen in FIG. 5, the cutting unit 58 has a grooved roller 59 which can cause scuffing when used with conventional mower coupling units.

Figure 6:
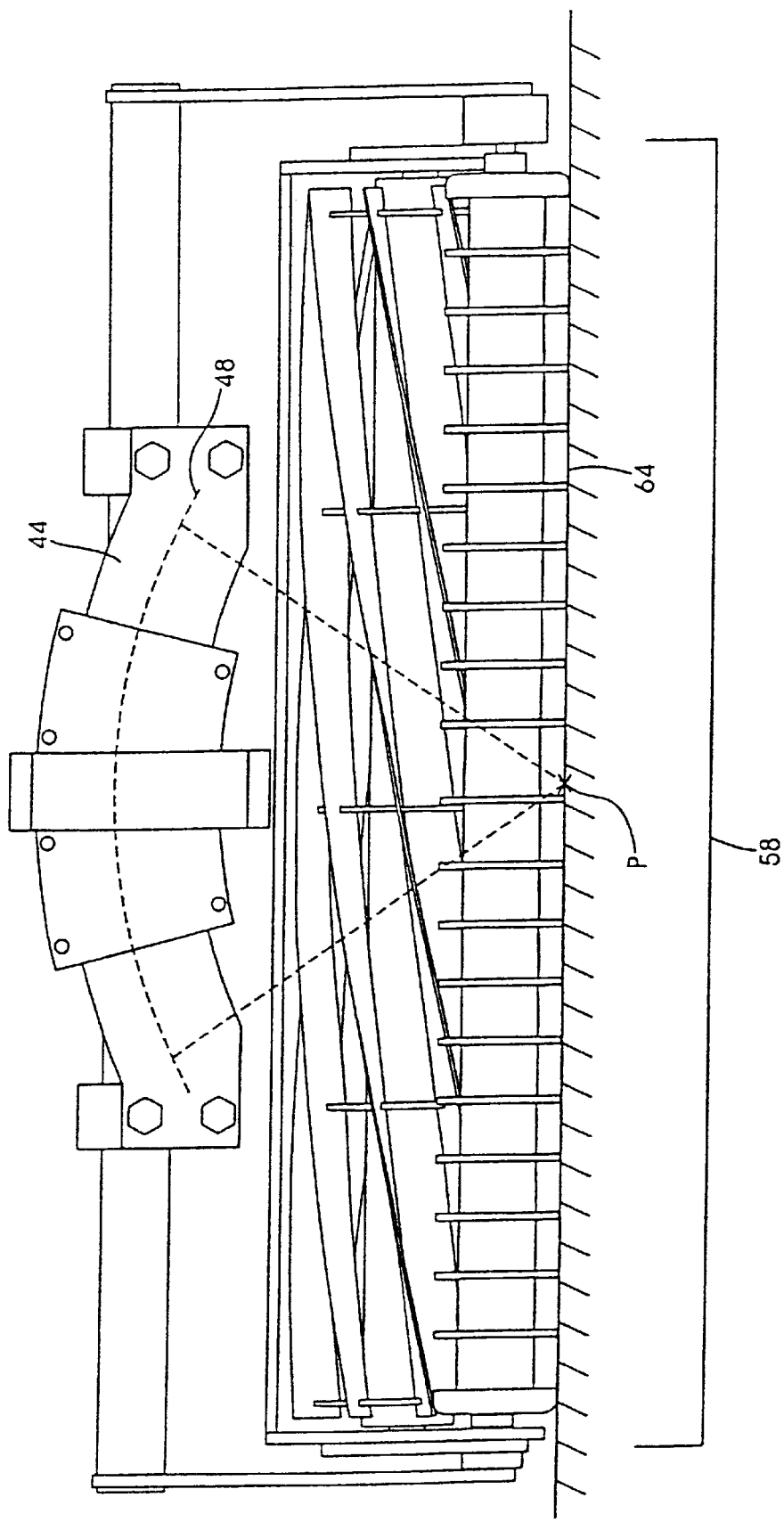
FIG. 6 is a front elevation of the mower coupling system and reel-type cutting unit in FIG. 5

FIG. 6 illustrates the path the arcuate member 44 follows. The arcuate member 44 passes along the radial path 48. The radial path 48 is defined by both the friction surfaces 46 and the surfaces on the arcuate member 44 where the arcuate member 44 contacts the friction surfaces 46. The radial path 48 defines a pivot axis P that is parallel to a traveling direction and is substantially coincidental with a point of contact between the cutting unit 58 and the ground 64 upon which the cutting unit 58 is supported. Significantly, pivot axis P will not move transversely relative to the direction of travel. The traveling direction is perpendicular to the plane shown in FIG. 6 and extends out from FIG. 6.

Figure 7:
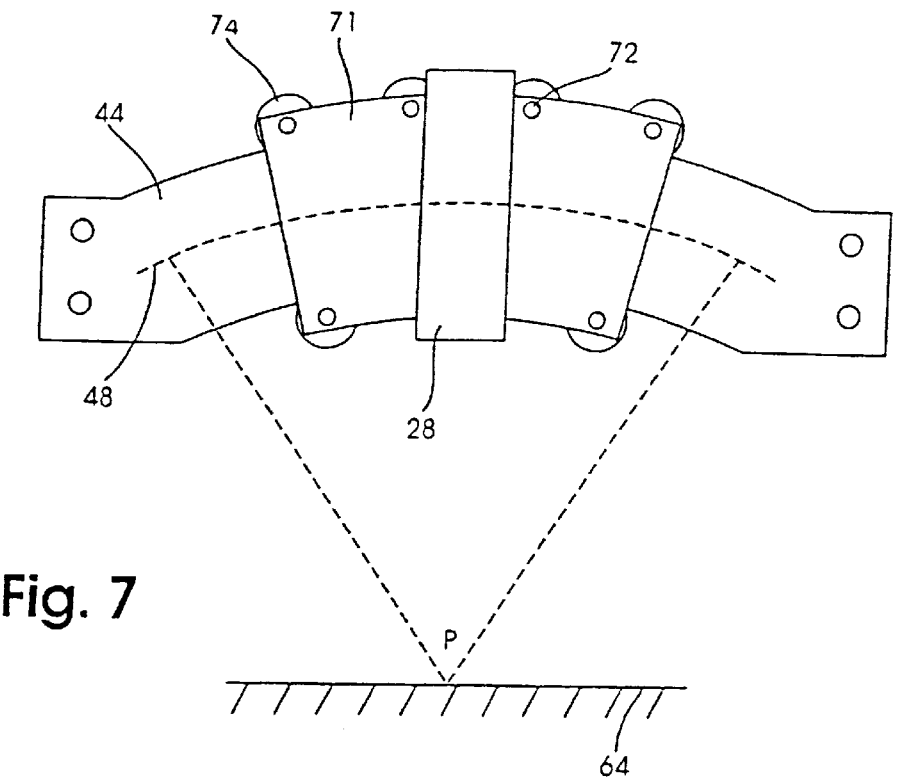
FIG. 7 is an alternative embodiment of the mower coupling system in FIG. 1.
Figure 8:
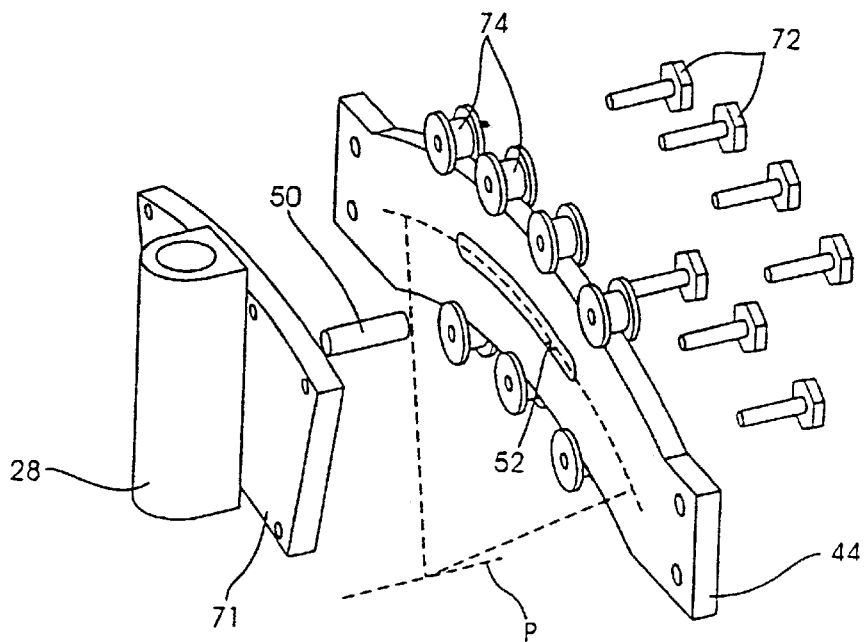
FIG. 8 is an exploded perspective view of the coupling system in FIG. 7.
Figure 9:
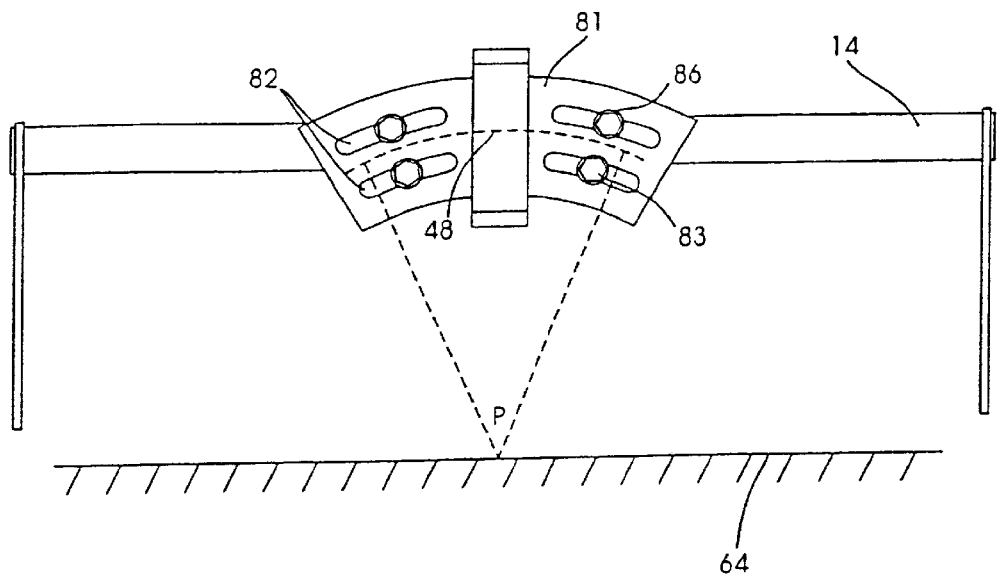
FIG. 9 is an alternative mower coupling system.
Figure 10:
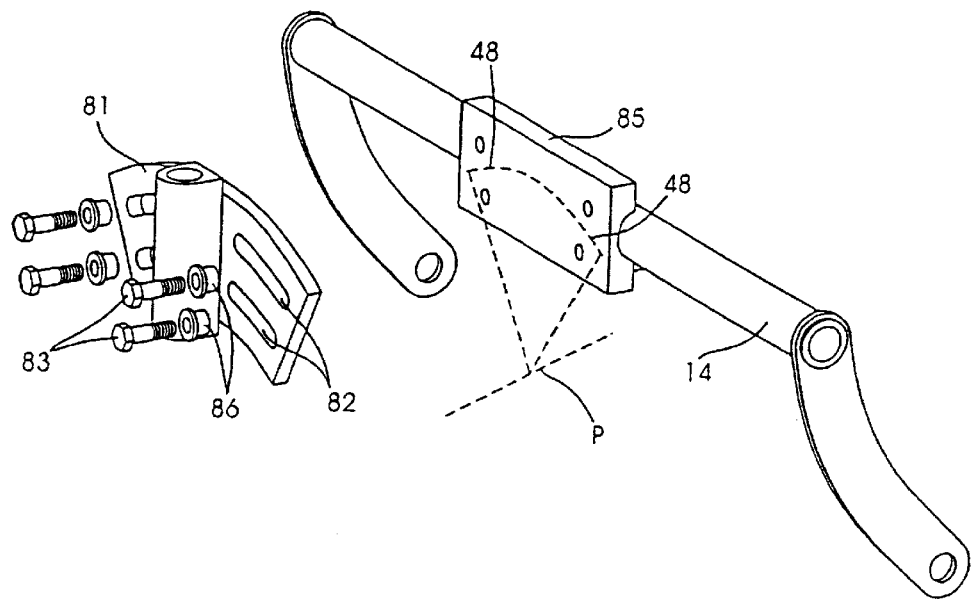
FIG. 10 is an exploded perspective view of the coupling system in FIG. 9.

With the presently preferred pivoting means, the arcuate member 44 and the friction surfaces 46 define the radial path 48 which then defines the pivot axis P at ground level. However, the invention is not limited in this regard and other pivoting means may also be used to create a pivot axis P that is parallel to a traveling direction, substantially coincidental with a point of contact between the cutting unit 58 and the ground 64 upon which the reel-type cutting unit 58 is supported, and remains in a fixed vertical plane in line with the direction of travel. For example, FIGS. 7 and 8 show an alternative method of guiding arcuate member 44 along path 48 by means of rollers 74 fixed to block 71 by pinions 72. Block 71, which is fixed to pin receiver 28, is configured to hold pin 50, which loosely interfits with slot 52 to limit the rotation of arcuate member 44. FIGS. 9 and 10 show an additional embodiment where four slots 82 in block 81 define path 48. Swivel block 85 is attached to tow bar 14, and is secured to block 81 by rollers 86 and pinions 83 so as to permit swivel block 85 to rotate freely along path 48. The rotation of swivel block 85 is limited by rollers 86 contacting either side of their corresponding slots 82.

In both alternative embodiments, the mechanism is designed such that guided path 48 has an axis P which is essentially coincidental with the surface of ground 64 as previously described. Significantly, it should be noted that other embodiments are also possible, and the invention is not intended to be limited to the specific configurations shown. Any other arrangement can be used for this purpose, provided that the position of the pivot axis is maintained as herein described.

Figure 11:
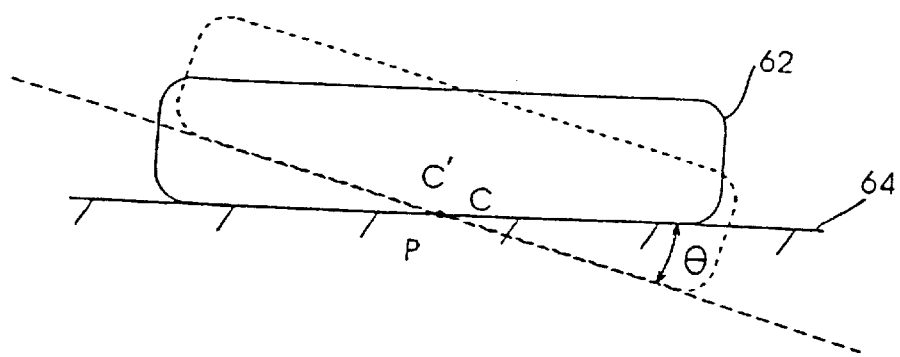
FIG. 11 is a diagrammatic front elevation of a roller with a pivot axis coincidental to a point of contact.
Figure 12:
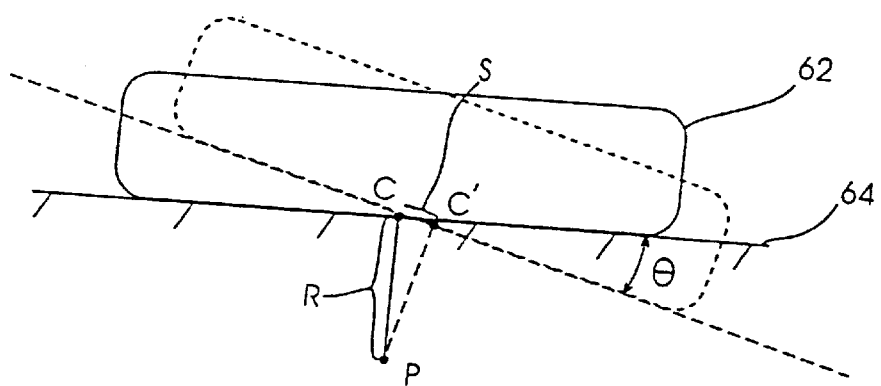
FIG. 12 is a diagrammatic front elevation of a roller with a pivot axis below a point of contact.
Figure 13:
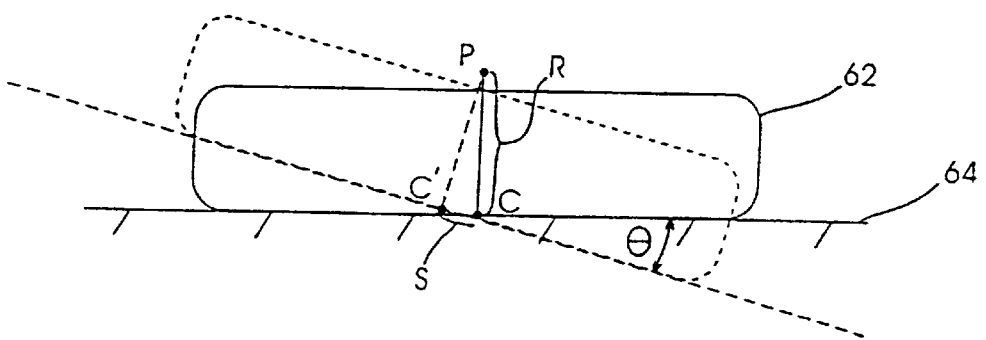
FIG. 13 is a diagrammatic front elevation of a roller with a pivot axis above a point of contact.

FIGS. 11, 12 and 13 illustrate side slippage and how side slippage is related to the location of the pivot axis P which is parallel to the direction of travel. Side slippage S can be best described using the equation:

$$S = R * \cos(90° - \theta)$$

R = Distance between pivot axis P and a point of contact C (the point of contact C is the intersection of a line of contact between the roller 62 and ground 64 and a line perpendicular to ground 64 and passing through the pivot axis P)

S=Side slippage distance between old point of contact C and new point of contact C'

θ=Angle the roller rotates with respect to ground 64

If the roller is positioned at horizontal (θ=0°), no side slippage S occurs no matter the distance R between the pivot axis P and the point of contact C. However, if the pivot axis P is above or below the point of contact C (R≠0), and the roller rotates (θ≠0°) with respect to ground 64, the point of contact C translates (slips) to a new point of contact C' in a direction transverse to the direction of travel (to the side), and thus, side slippage S is created. The extent of side slippage S is proportional to the distance R between the pivot axis P and the point of contact C.

As shown in FIG. 7, by positioning the pivot axis P substantially coincidental with the ground 64 (R=0), no side slippage S occurs no matter the angle (θ) the cutting unit rotates with respect to ground 64 because the new point of contact C' is always coincidental with the old point of contact C.

What is claimed is:

1. A coupling system for a lawn maintenance machine having at least one cutting unit, said system comprising:
    a pivoting means for pivoting said cutting unit around a pivot axis, said pivot axis parallel to a traveling direction and coincidental with a point of contact between said cutting unit and ground level thereby positioning the pivot axis coincidental to ground level at said point of contact; and,
    a yoke attached to said pivoting means, said yoke configured for attachment to a motive unit.

2. A coupling system according to claim 1, wherein said cutting unit is a reel-type unit.

3. A coupling system for a lawn maintenance machine according to claim 1, wherein positioning the pivot axis coincidental to ground level at said point of contact minimizes side slippage of the at least one cutting unit.

4. A coupling system for a lawn maintenance machine having at least one cutting unit, said system comprising:
    a pivoting means for pivoting said cutting unit around a pivot axis parallel to a traveling direction, and maintaining said pivot axis substantially aligned with a vertical plane parallel to the traveling direction and coincidental with a point of contact between said cutting unit and a surface upon which said cutting unit is supported, configured such that the pivot axis will essentially remain at a fixed point relative to the cutting unit as the pivoting means rotates about its axis, said pivoting means including
        a friction reducing means having friction surfaces defining a radial path, said radial path defining said pivot axis, and,
        an arcuate member passing pivotably about said pivot axis, said arcuate member attached to said cutting unit; and,
    a yoke attached to said pivoting means said yoke configured for attachment to a motive unit.

5. A coupling system according to claim 4, wherein said friction reducing means further comprises at least one friction pad disposed on a pivot block, said pivot block attached to said yoke.

6. A coupling system according to claim 4, wherein said friction surfaces are inner surfaces of a pivot block.

7. A coupling system according to claim 4, further comprising a motion limiter for limiting the pivoting motion of said arcuate member.

8. A coupling system according to claim 7, wherein said arcuate member passes through a pivot block and defines a slot through which passes a stop pin attached to said pivot block, said stop pin and said slot comprising said motion limiter.

9. A coupling system according to claim 8, wherein said yoke is attached to said pivot block using a pivot joint.

10. A coupling system according to claim 9, wherein said pivot joint further comprises:
    an upper and lower arm attached to said yoke having a pivot pin extending from said upper arm to said lower arm; and,
    a pin receiver attached to said pivot block, said pin receiver defining a bore for receiving said pivot pin.

11. A coupling system for a lawn maintenance machine having at least one cutting unit, said system comprising:
    a pivot block having an inner surface;
    a friction reducing means disposed on said inner surface and having friction surfaces facing an arcuate member attached to said cutting unit;
    a yoke attached to said pivot block, said yoke configured for attachment to a motive unit; and,
    said friction surfaces defining a radial path having a pivot axis parallel to a traveling direction, said arcuate member configured for movement along said radial path.

12. A coupling system according to claim 11, wherein said pivot axis is substantially coincidental with a point of contact between said cutting unit and a surface upon which said cutting unit is supported.

13. A coupling system according to claim 11, further comprising a motion limiter for limiting the pivoting motion of said arcuate member.

14. A coupling system according to claim 13, wherein said arcuate member defines a slot through which passes a stop pin attached to said pivot block, said stop pin and said slot comprising said motion limiter.

15. A coupling system according to claim 4, wherein said yoke is attached to said pivot block using a pivot joint.

16. A coupling system according to claim 15, wherein said pivot joint further comprises:
    an upper and lower arm attached to said yoke having a pivot pin extending from said upper arm to said lower arm; and,
    a pin receiver attached to said pivot block, said pin receiver defining a bore for receiving said pivot pin.

17. A coupling system according to claim 11, wherein said cutting unit is a reel-type unit.

18. A coupling system according to claim 11, wherein said friction reducing means is at least one friction pad.

19. A coupling system for a lawn maintenance machine having at least one cutting unit, said system comprising:
    a support member configured for attachment to the cutting unit;
    a yoke configured for attachment to a motive unit,
    a pivot member connecting said yoke to said support member, said pivot member providing a pivot axis parallel to a traveling direction and coincidental with a point of contact between the cutting unit and ground level thereby positioning the pivot axis coincidental to ground level at said point of contact, the cutting unit pivoting about said pivot axis.

* * * * *